United States Patent [19]

Bøen Per

[11] Patent Number: 4,798,696
[45] Date of Patent: Jan. 17, 1989

[54] METHOD FOR EXTRUSION OF PLASTIC TUBES, AND AN APPARATUS FOR CARRYING OUT SAID METHOD

[75] Inventor: Bøen Per, Fredrikstad, Norway
[73] Assignee: A/S Sonnichsen Rorvalseverket, Oslo, Norway
[21] Appl. No.: 47,781
[22] Filed: May 8, 1987
[51] Int. Cl.⁴ .............................................. B29C 47/24
[52] U.S. Cl. ........................... 264/209.2; 264/211.21; 264/310; 425/381; 425/382.3; 425/467
[58] Field of Search ................. 264/209.1, 209.2, 310, 264/211.21; 425/381, 376 B, 467, 382.3

[56] References Cited

U.S. PATENT DOCUMENTS

| | | | |
|---|---|---|---|
| 3,099,860 | 8/1963 | Schippers | 425/380 |
| 3,111,714 | 11/1963 | Branscum | 425/466 |
| 3,270,371 | 9/1966 | Schiedrum et al. | 425/467 |
| 3,276,075 | 10/1966 | Harwood | 425/381 |
| 3,355,769 | 12/1967 | Fogelberg | 425/466 |
| 3,376,605 | 4/1968 | Beattie | 425/376 R |
| 3,387,331 | 6/1968 | Billings | 264/209.2 |
| 3,423,790 | 1/1969 | Gabbrielli | 425/381 |
| 3,694,123 | 9/1972 | Cook et al. | 425/381 |
| 4,021,170 | 5/1977 | Anderson et al. | 425/381 |
| 4,591,323 | 5/1986 | Boen | 425/326.1 |
| 4,627,805 | 12/1986 | Schnell | 425/381 |

FOREIGN PATENT DOCUMENTS 110153 11/1966 Norway .

Primary Examiner—Jeffery Thurlow
Attorney, Agent, or Firm—Ladas & Parry

[57] ABSTRACT

A method and a device for extrusion of plastic tubes with use of a screw extruder which has a tube molding head comprising an external stationary nozzle and a mandrel which is supported against the nozzle head by the aid of ribs. The plastic material is made to rotate by the mandrel rotating about its axis and by the aid of inclined ribs that are attached to the nozzle wall or the mandrel. Then the edges of the screw line shaped cuts occuring due to said ribs are made to join together in a subsequent tool member. The apparatus comprises a screw extruder with a tube molding head comprising of an external stationary nozzle with a passage corresponding to the external contour of said tube, and a mandrel the cross section of which corresponds to the internal contour of said tube. The mandrel is rotatably, and the spokes or ribs are inclined or extend along a screw line and are attached to said mandrel or in the external mould member.

3 Claims, 1 Drawing Sheet

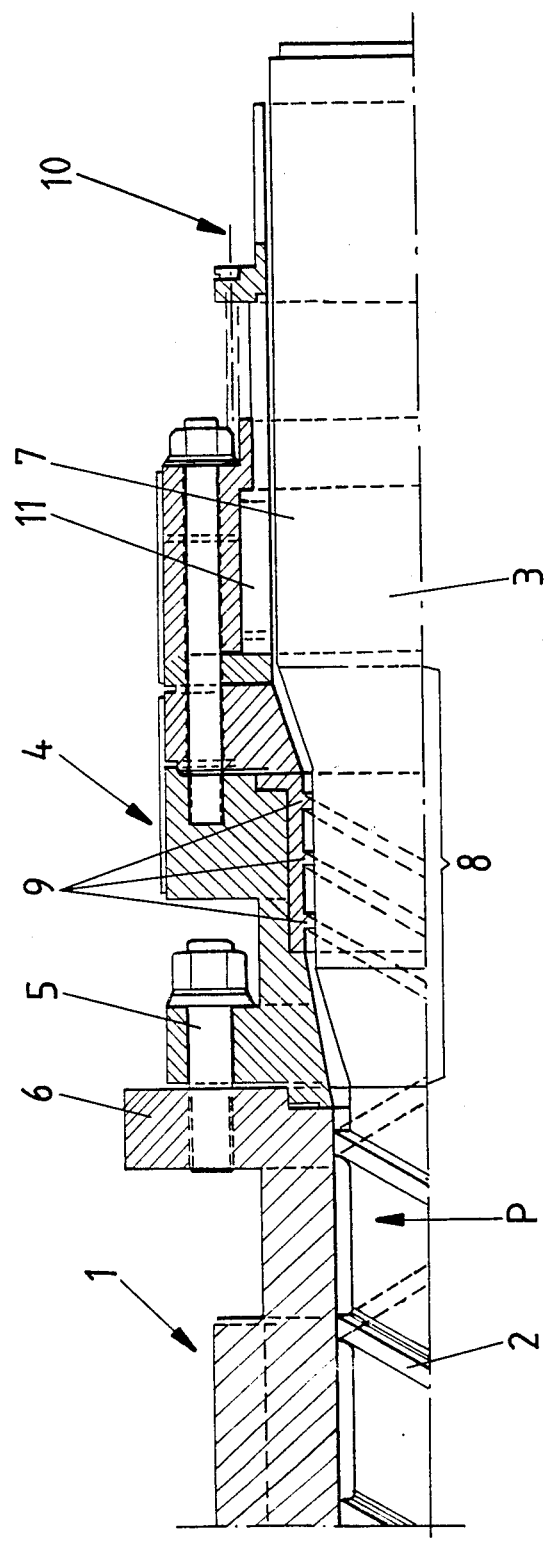

METHOD FOR EXTRUSION OF PLASTIC TUBES, AND AN APPARATUS FOR CARRYING OUT SAID METHOD

The present invention relates to a method for extrusion of plastic tubes, and an apparatus for carrying out said method.

In conventional production of plastic tubes extruders with one or a number of screws are used for processing, plasticizing, and conveying the material, as well as for urging the material through a nozzle head in an axial direction. Said head contains tools for forming the plastic tube, and the external part, the nozzle, and the internal part, the mandrel, are the most important molding members for the tube.

The mandrel is the mold member for the internal surface of the tube wall, and it is maintained in a centered position in the nozzle by the aid of ribs or spokes extending through the plastic material during production. For tubes of great dimensions the number of spokes may be up to 16.

When tubes are produced by the aid of the above mentioned equipment, the plastic material is divided into longitudinal strips by said spokes, and the edges of these strips must be joined after said spokes have been passed. This occurs automatically in the annular cavity which is present behind the spokes, and in the subsequent calibration device. These welding lines, however, form a weak part of the extrusion process, and the tube wall is often weakened along one or more such welding lines. This may be due to the fact that a longitudinal orientation of the molecules in the plastic material occur at the locations where said spokes pass through the material. Any weakening along axially extending lines in the tube is obviously most undesirable since such tubes are often exposed to radial tensions. Such weakening will be specially disadvantageous if the plastic tubes are to be used for supplying a pressurized liquid, e.g. in case of common supply of drinking water.

It is an object of the invention to eliminate the above mentioned disadvantage so as to provide stronger tubes with the same amount of material, or tubes having the same strength with a reduced consumption of material.

According to the invention this is achieved by a method for extrusion of plastic tubes by use of a screw extruder having a tube molding head which comprises an exterior stationary nozzle, and a mandrel supported against the nozzle wall by the aid of ribs or spokes. The characterizing features are that the plastic material is rotated by rotation of said mandrel about its axis; and that said mandrel is supported by the aid of inclined ribs which are attached to the nozzle wall and are in contact with said mandrel at their external surface and that the edges of the screw line shaped cuts in the material caused by said ribs are then made to join (are welded) together in a subsequent portion of the tool.

An apparatus for carrying out said method comprises a screw extruder with a tube molding head comprising an external stationary nozzle with a passage or a cavity corresponding to the external contour of the tube,and a core with a cross section corresponding to the internal contour of said tube, with said core or mandrel being supported against said external stationary nozzle by the aid of spokes or ribs. Said apparatus is characterized by the fact that said mandrel is rotatable in a manner known per se, and that said spokes or ribs are inclined or extend along a screw shaped line, and are attached to said external part of the mold, and that the external end faces are in arranged in supporting contact with said mandrel.

A preferred embodiment of the apparatus according to the invention with said ribs arranged so as to extend along a screw line and attached to the external stationary nozzle is characterized by the fact that said screw line extends in an opposite direction relative to the direction of said screw extruder.

BRIEF DESCRIPTION OF THE DRAWINGS

The sole FIGURE shows a partial section through an embodiment of the apparatus according to the invention.

DETAILED DESCRIPTION

On the external end of screw 2 of extruder 1 a molding mandrel 3 is attached so as to rotate with screw 2. The external molding tool, nozzle 4, is attached by the aid of bolts 5 to an annular flange 6 on the stationary part of said extruder. Between the actual molding portion 7 of mandrel 3 and the end of extruder screw 2 a portion 8 is provided serving to start molding the tube and constituting a transition area between the starting diameter of said extruder and the desired diameter of the tube to be produced. In this area 8 said mandrel must be supported so as to be kept in the center of the nozzle. As mentioned above, a stationary mandrel is used in conventional tube extruders, and it was in said area 8 the spokes were arranged. Instead of such spokes supporting ribs 9 are provided in the apparatus according to the invention, and said ribs extend along a screw line. As will appear from the FIGURE said ribs extend along a screw line of opposite direction relative to the pitch line of screw 2. The reason for this is that when said screw is rotated in the direction of arrow P the plastic material will be forced to start rotating in the same direction. This effect may be enhanced if mandrel portion 8 has a rough surface. The partly rotating material will be caught by ribs 9 and guided into screw line rotation. The plastic material passing said supporting ribs 9 will, thus, be divided into screw line shaped strips. The edges between said screw line shaped strips will start flowing together already in the remaining portion of intermediate area 8, and they will be completely welded together after passing out of tube moulding portion 7. Behind said portion a calibrating device 10 and a stripper, not shown are provided in a conventional manner. Adjacent tube moulding member 7 a lubricating means of the kind as disclosed in Norwegian patent application No. 833433 is provided, as indicated at 11. As described above, said screw line shaped ribs or spokes have two functions, viz.:

1. to guide the rotating mandrel at the center
2. to make the plastic material rotate.

Thus, both the screw line shape of said ribs, the pressure of the material in front of said ribs, and the friction between the plastic material and the mandrel contribute to make the plastic material rotate.

As mentioned above, tubes produced according to the method of the present invention will have greater strength against internal pressure. Additionally, said tubes will be advantageous when expanded in other manners, e.g. in case of expansion to form a socket,and expanding to achieve orientation of the molecules of the material.

Having described my invention, I claim:

1. A method for extrusion of plastic tubes by a screw extruder having a screw line and a tube molding head comprising an external stationary nozzle and a mandrel supported against a nozzle wall by means of ribs or spoke, the method comprising the steps of;
   rotating plastic to be extruded in the same direction as the rotation of said screw extruder to form screw line shaped strips; and
   flow welding said strips to form a tube.

2. Apparatus for extrusion of plastic tubes comprising a screw extruder having a screw line and a tube molding head including an external stationary nozzle having a passage corresponding to an external contour of a tube to be extruded;
   a rotatable mandrel having a cross-section corresponding to the internal contour of said tube;
   ribs for supporting said mandrel within said nozzle, said ribs extending along a screw line and being attached to said nozzle, external faces of said ribs being in supporting contact with said mandrel, said screw line of said ribs having a direction opposite that of said extruder screw whereby plastic to be extruded is rotated in the same direction as the rotation of said screw extruder to form screw line shaped strips; and
   means for flow welding said strips to form a tube.

3. A device as defined in claim 2, characterized in that said mandrel has a rough surface.

* * * * *